United States Patent [19]

Egner-Walter et al.

[11] Patent Number: 4,991,251
[45] Date of Patent: Feb. 12, 1991

[54] WIPER ARM, ESPECIALLY FOR WINDSHIELD WIPER SYSTEMS ON MOTOR VEHICLES

[75] Inventors: Bruno Egner-Walter, Heilbronn; Eckhardt Schmid, Brackenheim; Wolfgang Scholl, Gemmrigheim, all of Fed. Rep. of Germany

[73] Assignee: SWF Auto-Electric GmbH, Bietigheim-Bissingen, Fed. Rep. of Germany

[21] Appl. No.: 294,632

[22] PCT Filed: Nov. 27, 1987

[86] PCT No.: PCT/EP87/00736
§ 371 Date: Dec. 20, 1988
§ 102(e) Date: Dec. 20, 1988

[87] PCT Pub. No.: WO88/08798
PCT Pub. Date: Nov. 17, 1988

[30] Foreign Application Priority Data

May 2, 1987 [DE] Fed. Rep. of Germany ....... 3714649

[51] Int. Cl.⁵ .............................................. B60S 1/34
[52] U.S. Cl. ................................. 15/250.2; 15/250.33
[58] Field of Search ............ 15/250.12, 250.13, 250.2, 15/250.33

[56] References Cited

U.S. PATENT DOCUMENTS

| | | | |
|---|---|---|---|
| 2,736,053 | 2/1956 | Oishei et al. | 15/250.2 X |
| 4,370,774 | 2/1983 | Bienert et al. | 15/250.20 |
| 4,698,872 | 10/1987 | Watanabe | 15/250.2 |
| 4,736,484 | 4/1988 | Bauer et al. | 15/250.2 |

FOREIGN PATENT DOCUMENTS

| | | | |
|---|---|---|---|
| 1919412 | 10/1970 | Fed. Rep. of Germany | 15/250.2 |
| 3523546 | 10/1986 | Fed. Rep. of Germany | |
| 3521527 | 12/1986 | Fed. Rep. of Germany | |
| 3530108 | 12/1986 | Fed. Rep. of Germany | 15/250.2 |
| 2124713 | 9/1972 | France | |
| 2544677 | 10/1984 | France | |
| 55-160637 | 12/1980 | Japan | 15/250.2 |
| 57-44550 | 3/1982 | Japan | 15/250.2 |
| 912469 | 12/1962 | United Kingdom | |

*Primary Examiner*—Frankie L. Stinson
*Attorney, Agent, or Firm*—Robert P. Seitter; J. Gordon Lewis

[57] ABSTRACT

This invention relates to a wiper arm with the possibility of adjusting its contact pressure, wherein the link may be brought into a stable tilted position. Upon tilting the point of application of the wiper arm pressure spring on this side of the fastening member is displaced in the direction of the articulated axle between wiper arm fastening member and wiper arm link in a manner that the perpendicular spacing between the line of application of the pressure spring and the articulated axle is diminished. This is why a small tilting angle can be realized.

15 Claims, 1 Drawing Sheet

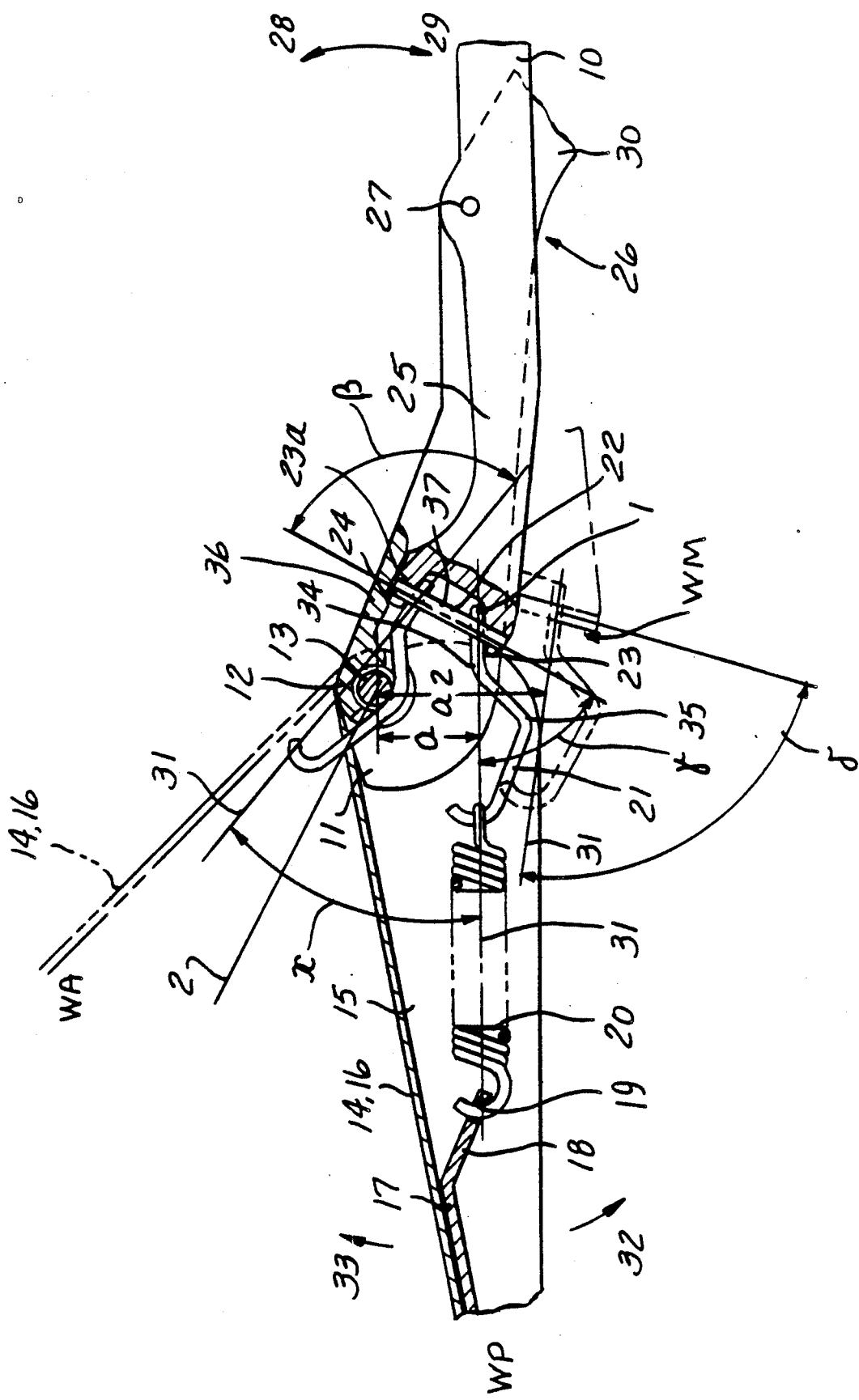

WIPER ARM, ESPECIALLY FOR WINDSHIELD WIPER SYSTEMS ON MOTOR VEHICLES

TECHNICAL FIELD

This invention relates to a wiper arm.

BACKGROUND OF THE INVENTION

A wiper arm of this kind is known from the German patent specification No. 35 23 546. This known wiper arm has a two-armed lever mounted on the fastening member and pivotable about a shaft mounted perpendicularly to the longitudinal direction of the wiper arm. An adjusting member mounted within the wiper shaft acts upon the first arm of the lever which is closest to the wiper shaft. A pressure spring connects a link and a wiper rod projecting into the link with the second arm of the lever. In order to regulate the contact pressure between a wiper blade attached to the wiper rod and the windshield, the lever can be continuously adjusted between two positions. Because of the possibility of adjusting the contact pressure this known wiper arm is suitable for windshield wiper systems of motor vehicles which can be driven very rapidly. If the vehicle speed is very high the contact pressure must be higher than usual, so that the wiper blade mounted on the wiper rod cannot be lifted off the windshield by the slip stream.

In this known wiper arm, to replace the wiper blade the link can be rotated about an axle into a replacement position, in which the line of application of the pressure spring between the wiper rod and the second lever arm lies beyond the dead center line of the spring relative to an articulated axle between fastening member and link. The lever is fully extended in the replacement position, and the link is offset from its operating position by an angle of about 85°. Such a large angle is unfavourable for various reasons. On the one hand this known wiper arm cannot be used in windshield wiper systems in which the wiper arm is covered by body portions in the area of the fastening member, particularly in the area of the link. On the other hand the link and the parts connected with it (wiper rod and/or wiper blade) can impact the windshield with great force if the link is moved by hand from the tilted position into the parking position and is erroneously released too early. The window shield or the wiper arm can be heavily damaged as a result of such an impact.

SUMMARY OF THE INVENTION

It is the object of the present invention to improve upon the unknown wiper arm by providing a stable replacement position with a tilting angle as small as possible.

According to the present invention this problem is solved by variable displacement of the second point of application of the pressure spring relative to the articulated axle between the fastening member and the link. As compared to usual constructions having a non-displaceable point of application the tilting angle of the present invention is diminished, because by displacement of the second point of application the perpendicular spacing between articulated axle and the line of application of the pressure spring is reduced.

As in the known wiper arm, the second point of application of the pressure spring can be displaced during operation by moving the lever. For this purpose, an adjusting drive mechanism must be used. However, in addition to displacement by movement of the lever, the second point of application of the present invention may be displaced linearly along a guide rail traversing the longitudinal axis of the lever.

In principle the second point of application of the pressure spring need not be displaced much. For example it can be displaced so far that, the line of application of the pressure spring extends above its dead center line opposite the articulated axle between fastening member and link.

By linear displacement of the second point of application of the pressure spring further extension of the spring and thus a load on the spring that results in a premature reduction of spring performance can be avoided.

In principle the displacement of the second point of application of the pressure spring could be effected by guiding the point of application within an oblong hole worked into the lever. However, with an accumulation of dirt, ice or rust in the oblong hole, there exists the risk of the second point of application of the pressure spring not reaching its predetermined end position when a guide of this kind is used. This is why in the present invention the second point of application of the pressure spring is slidingly and movably supported along a guide rail. Guide rail support of the second point of application of the pressure spring can also be realized in a wiper arm having no contact pressure adjustment means.

Preferably, a particularly smooth sliding during the entire service life of the rail is ensured by using stainless steel for construction of the guide rail and the portion of the spring at the second point of application.

It is principally ensured that the second point of application of the pressure spring is not inadvertently displaced by construction of the wiper arm so that the second point of application is reliably supported. If stainless steel is used the frictional angle, that is the the angle which does not permit the adjacent parts to slidingly move amounts to about 8.5°.

Practice shows that an angle of 45° between the replacement position and the normal operating position is of particular advantage. In such a position the link does not occupy a position so far from the windowshield that it would contact the windshield with great force when erroneously released to its parking position. In the present invention, the line of application of the spring in the the tilted position is meant to extend above the articulated axle between fastening member. Because link and the articulated axle has to be formed by a rivet supported in a receiver formed into the fastening member the axle thus has a relatively large cross-section. Therefore, measures must be taken to prevent the second point of application from hitting the axle before the line of application is positioned beyond the articulated axle. this can be achieved by providing, that the articulated axle is avoided by a bend in the spring or by a yoke through of which the pressure spring acts upon the lever that encompasses the axle. The axle can be also realized by the use of two co-axial hinge rivets, which are held with a spacing between each other in two receivers of the fastening member. Preferably, a single rivet and a fastening member is used for the articulate axle.

Preferably, the guide rail for the second point of application of the pressure spring can be held on the contact pressure adjustment lever by means of a receiver formed by two tines having a common bore.

In theory it is also possible to produce rail and lever in one piece. This is, however, not recommended if the lever is made from die-casting material, because a satisfactory mechanical stability of the rail can not be ensured.

BRIEF DESCRIPTION OF THE FIGURE

The single FIGURE of this drawing shows a longitudinal section through a wiper arm in various positions.

DETAILED DESCRIPTION OF THE INVENTION

The wiper arm is provided on a motor vehicle windshield wiper system and has a fastening member 10 which by means of its rear end not shown is fixed firm on a wiper shaft. The fastening member 10 has two side walls 11 extending in the longitudinal direction of the wiper arm, of which side walls each has a receiver 12 positioned closely to its front end and extending perpendicularly to the longitudinal direction of the wiper arm and meant to receive an articulated axle 13 formed by a hinge rivet. Furthermore, the wiper arm has a link 14 with a U-shaped cross-section formed by two side walls 15 interconnected by a web 16. Link 14 is articulated on the hinge rivet 13 by means of the side walls 15. The side walls 15 and the web 16 encompass a wiper rod 17. The wiper rod is connected to a wiper blade not shown in the drawing. Its end positioned within the link 14 is bent downwards and provided with an aperture 19. In this aperture is suspended the first point of application of a pressure spring 20 formed as a tension spring which is also suspended at a rail 22 realized by a cylindric pin of stainless steel at a second point of application 1 behind and below the articulated axle 13 by means of a yoke 21 of stainless steel extending in the longitudinal direction of the wiper arm. The pin 22 is positioned in an inclined manner relative to the wiper arm. height between two tines 23 and 24, of which each has a bore 23a into which the end of the pin 22 is pressed. The tines 23 and 24 are part of a second arm 25 of a two-armed lever 26 extending between the side walls 11 of the fastening member 10. The lever 26 is mounted to be pivotable about a shaft 27 both upwards in the direction of arrow 28 and downwards in the direction of arrow 29. The shaft 27 traverses the longitudinal axis of the wiper arm. Upon the end not shown of the first arm 30 of the lever 26 opposite the shaft 27 acts on adjusting drive which moves the lever 26 in the two directions 28 and 29. The lever 26 can be continuously adjusted between two predetermined operating positions WP and WM in the two directions 28 and 29. One operating position WP is shown with full lines, the other operating position WM with broken lines.

In position WP shown with full lines the line of application 31 of the tension spring 20 extends below the articulated axle 13 with a perpendicular spacing from the articulated axle 13. Thus link 14 and wiper rod 17 and wiper blade connected with it are prestressed with a certain force in the direction of rotation 32 against the windshield not shown. This is the parking position WP of the wiper arm which is identical with a first operating position.

When the wiper shaft rotates, the adjusting drive mechanism not shown acts upon lever 26 in dependence on the vehicle speed. If the vehicle speed is high the lever 26 is extended in direction 28 so far that it reaches the end position WM shown by broken lines. In this position the line of application 31 of the tension spring 20 extends at a perpendicular spacing a2 below the articulated axle 13, which is larger than the spacing a. Therefore, link 14 wiper rod 17 and wiper blade are pressed against the windshield with a greater force than in the first operating position WP. This is the operating position WM of the wiper arm in which the maximum desired contact pressure of the wiper blade against the windshield exists. The contact pressure being so high that the wiper blade can wipe the window pane and is not lifted off by the slip stream of high speed.

If the vehicle drives less rapidly the lever 26 and the link 14 occupy a position in dependence on the vehicle speed between positions WM and WP which ensures that the wiper blade can wipe the window pane and is not lifted off by the less intensive slip stream.

In order to exchange the wiper blade the link 14 and the wiper rod 17 and wiper blade connected with it can be rotated about the articulated axle 13 in the direction of rotation 33 into the replacement position WA indicated by dash-dotted lines. In the replacement position WA the line of application 31 of the tension spring 20 extends above the thus beyond the dead center 2 of the tension spring 20 relative to the articulated axle 13. As compared to the line of application of parking position WP, the line of application of tilted position WA is displaced at an angle $\alpha$ of 45°. This tilting angle $\alpha$ of 45° is of particular advantage, since the link 14 does not occupy a position which is far from the window shield that it could impact the windowshield with great force in the direction of rotation 32 due to the effect of the pressure spring if it were inadvertently released when carrying out the return movement, thereby damaging the yoke parts of the wiper blade.

Because of the wiper arm construction of the present invention, a tilting angle $\alpha$ of 45° can be realized, upon tilting the link 14 the second point of application 1 of the tension spring 20 is displaced in the upward direction 28 of the lever 26 relative to the articulated axle. Displacement of the second point of application 1 of the tension spring 20 relative to the articulated axle 13 between fastening member 10 and the link 14 as compared with usual constructions equipped with a second unmovable point of application of the tension spring decreased the necessary tilting angle. By displacement of the second point of application, the perpendicular spacing a between axle 13 and the line of application 31 of the tension spring 20 is reduced.

In the present invention the second point of application 1 of the tension spring 20 can slide along the cylindric pin 22. For this purpose the yoke 21, via which the tension spring is suspended at the pin 22, is equipped with a U-shaped eye 34 which encompasses the pin 22. The yoke 21 has approximately in its center a downwardly directed bulge 35 which is adapted to encompass the diameter of the articulated axle 13. Thus, in the tilted position WA the yoke 21 adjoins the underside of the articulated axle 13 and the line of application 31 of the tension spring 20 extends above the articulated axle 13. In addition the upper tine 24 of the lever 26 is thereby positioned alongside a cover 36 connecting the upper edge of the side walls 11 of the fastening member 10. The U-shaped eye 34 thereby rests against a stop face realized by the underside of the upper tine 24 of the lever 26.

The pin 22 is held between the tines 23 and 24 of the lever 26 in such a way that the line of displacement along its shaft 37 in the replacement position WA intersects the line of application 31 of the tension spring 20 at an angle β of about 100°. Thus the tension spring 20 is effective in the direction of rotation 33 at an angle larger than a composed angle of 98.5° consisting of an angle of 90° plus the frictional angle of about 8.5° for the eye 34 of yoke 21 and pin 22 which are both made from stainless. If an angle greater than 98.5° was not achieved the eye 34 would slide downwards along the pin 22, so that the line of application 31 of the spring would be displaced downwards and the link 14 would be tilted back into the parking position WP. Thus, the tilted position WA is stable, and the link 14 and the parts of wiper rod 17 and wiper blade connected with it cannot be moved inadvertently into the parking position WP by a guest or the like.

The parking position WP is also stable. In this position the eye 34 of the yoke 21 rests against the stop face formed by the upperside of the lower tine 23 of the lever 26. The lever 26 occupies the same position as in the tilted position WA. The line of displacement along the shaft 37 of the pin 22 intersects the line of application 31 of the tension spring 20 at an angle of γ of about 60°. this angle γ is smaller than the composed angle of 98.5° consisting of angle of 90° plus the frictional angle of 8.5° between eye 34 and pin 22. If this angle were exceeded the eye 34 would slide upwards along the pin 22, so that the line of application 31 of the spring would be displaced upwards and thus the tension spring 20 would be less effective in the direction of rotation 32.

The operation position WM in which the contact pressure is maximized is also stable. Just as in the position WP the eye 34 of the yoke 21 rests against the stop face formed by the upperside of the lower tine 23 of the lever 26. The line of displacement along the shaft 37 of the pin 22 intersects the line of application 31 of the tension spring 20 at an angle δ of about 85°. δ is smaller than the composed angle of 98.5° consisting of an angle of 90° plus the frictional angle between eye 34 and pin 22 of 8.5°. Thus the eye 34 cannot slide upwards along the pin 22 and the tension spring is just as effective in the direction of rotation 32.

In the operating positions not shown and lying between the operating positions WM and WP the angle enclosed by the intersection of the line of application 31 of the tension spring 20 and line of application along the the shaft 37 of the pin 22 varies between 60° and 85°. thus also in this case the eye 34 cannot slide upwards along the pin 22 and, consequently, in the direction of rotation 32 the tension spring 20 is effective, so that in any position the contact pressure wanted exists.

In another embodiment of the present invention, instead of yoke 21, a so-called stalk-eye-spring could be used just as well whose stalk is formed with a bulge 35. Alternately, buldge 35 could be omitted on the yoke 21 or on the stalk-eye spring if a divided articulated axle were used between fastening member and link consisting of two hinge rivets or the like.

Preferably the rail is formed as pin 22 and thus as a separate part, where the lever 26 is constructed of relatively soft material. If the lever were produced from steel or similar hard material it would be possible to produce the lever 26 in one piece with the rail 22.

In an alternative embodiment, displacement of the second point of application 1 of the tension spring along a rail 22 upon tilting of the link 14 is accomplished in a wiper arm not having an adjusting drive mechanism. In such an embodiment the rail 22 coulbe fastened onto a covering 36 of the fastening member 10 or, if the covering were made of a suitable material like steel, could be produced in one piece with it.

The use of other materials than steel for the rail and for the yoke of the pressure spring is possible. The materials have only to be hard, so that there breaking strength is ensured and they have to have low friction values, so that is possible for the structural part to slide easily on the rail. Also metals with a teflon layer or a layer of other plastic materials can be used.

We claim:

1. A wiper arm of a wiper system for a vehicle windshield comprising:
a fastening member having an end adapted for attachment to a wiper shaft;
a link mounted on said fastening member for pivotal movement of said link about a first axis transverse to the length of said fastening member;
a wiper rod attachment to said link and adapted to receive a wiper blade;
a lever mounted on said fastening member for pivotal movement of said lever about a second axis transverse to the length of said fastening member and at a point between said first axis and said end of said fastening member adapted for attachment to said wiper shaft, said lever having a first end adapted for attachment to an adjusting drive mechanism;
a guide unit at a second end of said lever;
and spring means having a first end connected to said wiper rod and a second end connected to said guide unit for: (a) urging a wiper blade attached to said wiper rod against a vehicle windshield while said spring means are in a wiper blade operating position to a first side of a dead center line and, (b) maintaining said wiper blade in a tilted position spaced from said vehicle windshield while said spring means are in a wiper blade replacement position to a second side of said dead center line opposite from said first side, said second end of said spring means movable along said guide unit when said wiper blade is moved to and from said vehicle windshield and said tilted position and said spring means move to and from said front side of said dead center line and said second side of said dead center line.

2. A wiper arm according to claim 1 wherein said guide unit defines a straight line along which said second end of said spring means moves.

3. A wiper arm according to claim 2 wherein said guide unit includes a rail to which said second end of said spring means are connected.

4. A wiper arm according to claim 3 wherein said spring means include a coil spring having a first end connected to said wiper rod and a yoke connected between a second end of said coil spring and said rail.

5. A wiper arm according to claim 4 wherein said end of said yoke connected to said rail has a U-shaped eye which engages said rail.

6. A wiper arm according to claim 5 further including an axle having a rotation axis defined by said first axis and said yoke is shaped to extend around said axle when said wiper blade is in said tilted position and said spring means are in said wiper blade replacement position.

7. A wiper arm according to claim 3 wherein a pair of tines are formed in said second end of said lever and said rail extends between said tines.

8. A wiper arm according to claim 2 wherein said straight line intersects the axis of said spring means at an angle other than a right angle when said spring means are in said wiper blade replacement position.

9. A wiper arm according to claim 8 wherein said axis of said spring means when said spring means are in said wiper blade replacement position and said axis of said spring means when said spring means are in a position corresponding to said wiper blade operating position define an angle of forty-five degrees.

10. A wiper arm according to claim 2 wherein said straight line intersects the axis of said spring means while said spring means are in said wiper blade operating position at an angle less than a right angle plus the friction angle between said spring means and said guide unit.

11. A wiper arm according to claim 2 wherein said straight line intersects the axis of said spring means while said spring means are in said wiper blade replacement position at an angle greater than a right angle plus the friction angle between said spring means and said guide unit.

12. A wiper arm according to claim 2 wherein said straight line intersects the axis of said spring means at an angle other than a right angle when said spring means are in said wiper blade operating position.

13. A wiper arm of a wiper system for a vehicle windshield comprising:
    a fastening member having an end adapted for attachment to a wiper shaft;
    a link unit mounted on said fastening member for pivotal movement of said link unit about a first axis transverse to the length of said fastening member and having a wiper rod adapted to receive a wiper blade;
    a lever mounted on said fastening member for pivotal movement of said lever about a second axis transverse to the length of said fastening member and at a point between said first axis and said end of said fastening member adapted for attachment to said wiper shaft, said lever having a first end adapted for attachment to an adjusting drive mechanism;
    a guide unit at a second end of said lever;
    and spring means having a first end connected to said link unit and a second end connected to said guide unit for: (a) urging a wiper blade attached to said wiper rod against a vehicle windshield while said spring means are in a wiper blade operating position to a first side of a dead center line and, (b) maintaining said wiper blade in a tilted position spaced from said vehicle windshield while said spring means are in a wiper blade replacement position to a second side of said dead center line opposite from said first side, said second end of said spring means movable along said guide unit when said wiper blade is moved to and from said vehicle windshield and said tilted position and said spring means move to and from said first side of said dead center line and said second side of said dead center line.

14. A wiper arm according to claim 13 wherein said guide unit defines a straight line along with said second end of said spring means moves.

15. A wiper arm according to claim 14 wherein said guide unit includes a rail to which said second end of said spring means are connected.

* * * * *